(12) United States Patent
Zhao et al.

(10) Patent No.: US 12,437,813 B2
(45) Date of Patent: Oct. 7, 2025

(54) METHOD OF REDUCING PROGRAM OPERATION TIME IN 3D NAND MEMORY SYSTEMS

(71) Applicant: Yangtze Memory Technologies Co., Ltd., Hubei (CN)

(72) Inventors: XiangNan Zhao, Hubei (CN); HongTao Liu, Hubei (CN)

(73) Assignee: Yangtze Memory Technologies Co., Ltd., Hubei (CN)

( * ) Notice: Subject to any disclaimer, the term of this patent is extended or adjusted under 35 U.S.C. 154(b) by 346 days.

(21) Appl. No.: 18/186,596

(22) Filed: Mar. 20, 2023

(65) Prior Publication Data

US 2024/0296889 A1 Sep. 5, 2024

(30) Foreign Application Priority Data

Mar. 1, 2023 (CN) .......................... 202310204300.0

(51) Int. Cl.
*G11C 16/14* (2006.01)
*G11C 16/04* (2006.01)
*G11C 16/10* (2006.01)

(52) U.S. Cl.
CPC .......... *G11C 16/10* (2013.01); *G11C 16/0483* (2013.01)

(58) Field of Classification Search
CPC ..................................................... G11C 16/14
See application file for complete search history.

(56) References Cited

U.S. PATENT DOCUMENTS

2019/0066797 A1* 2/2019 Yip .................. G11C 16/14

* cited by examiner

*Primary Examiner* — Jason Lappas
(74) *Attorney, Agent, or Firm* — Conley Rose, P.C.

(57) ABSTRACT

Disclosed herein are an exemplary memory device and methods for programing the memory device. In an aspect, a memory device comprises a memory configured to store a program code and a processor. The processor can be configured to perform a first programming to a memory cell of the memory device with a first step voltage value. The processor is further configured to determine that a step voltage increase condition is met. The processor can also be configured to perform a second programming to the memory cell of the memory device with the second step voltage value. The second step voltage value is greater than the first step voltage value by an incremental voltage value.

13 Claims, 11 Drawing Sheets

| Pulse No. | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| P1 | • | • | • |   |   |   |   |   |   |   |   |   |   |   |   |   |   |
| P2 |   |   | • | • | • |   |   |   |   |   |   |   |   |   |   |   |   |
| P3 |   |   |   |   | • | • |   |   |   |   |   |   |   |   |   |   |   |
| P4 |   |   |   |   |   | • | • | • |   |   |   |   |   |   |   |   |   |
| P5 |   |   |   |   |   |   |   | • | • | • |   |   |   |   |   |   |   |
| P6 |   |   |   |   |   |   |   |   |   | • | • | • | • |   |   |   |   |
| P7 |   |   |   |   |   |   |   |   |   |   |   |   | • | • | • | • | • |

METHOD OF REDUCING PROGRAM OPERATION TIME IN 3D NAND MEMORY SYSTEMS

CROSS-REFERENCE TO RELATED APPLICATIONS

This application claims priority to Chinese Patent Application No. 202310204300.0, entitled "METHOD OF REDUCING PROGRAM OPERATION TIME IN 3D NAND SYSTEMS", filed Mar. 1, 2023, which is hereby incorporated by reference herein in its entirety.

TECHNICAL FIELD

This description relates to a memory device and a method for programming operations. Specifically, the memory device and the method improve the efficiency of program operations.

BACKGROUND

A memory device, such as a flash memory device, can program a memory cell of the memory device by applying a voltage, such as a programming voltage, to a word line coupled to the memory cell. The memory device then verifies whether or not the memory cell satisfies a voltage range or a required voltage. For example, the memory device can apply one or more reference voltages to the memory cell to determine whether a threshold voltage of the memory cell is within the voltage range or satisfies the required voltage. In some aspects, memory cells in a same memory page of the memory device shared the same word line and can be programmed simultaneously.

In some aspects, the memory device can program the memory cells using an incremental step pulse programming (ISPP) scheme with a step pulse. The ISPP scheme can improve the accuracy and reliability of programming the memory cells.

SUMMARY

The present disclosure improves the speed of programming the memory cells of the ISPP scheme.

Some aspects of this disclosure relate to memory devices and methods for programming operations. For example, the memory devices and the methods are provided for improving the efficiency of programming operations.

Some embodiments of this disclosure relate to a method of operating a memory device having memory cells. The method comprises performing a first programming to a memory cell of the memory device with a first step voltage value and determining that a step voltage increase condition is met. The method further comprises performing a second programming to the memory cell with a second step voltage. The second step voltage is greater than the first step voltage value by an incremental voltage value.

Some aspects of this disclosure perform programming operations by using an ISPP scheme in which the programming voltage can be increased by adding a step pulse. In some aspects, the step pulse is also referred to as a step voltage. For example, the memory device verifies the memory cell after a programming voltage is applied to a word line coupled to the memory cell. If a threshold voltage of the memory cell does not reach a target programming state, e.g., the threshold voltage is not within a required voltage range, the memory device increases the programming voltage by the step pulse and applies the increased programming voltage to the word line coupled to the memory cell. If the threshold voltage of the memory cell reaches the target programming state, e.g., the threshold voltage is within the required voltage range, the memory device may inhibit the memory cell.

In some aspects, the step pulse is a constant voltage value. In other words, the memory device increases the programming voltage by a same incremental voltage in ISPP programming, wherein the ISPP programming programs memory cells using the ISPP scheme. To ensure the accuracy and reliability of the ISPP programming, the memory device can set the step pulse to be a small voltage value so that the memory cell will not be overcharged. For example, the programming voltage increases slightly when the threshold voltage of the memory cell does not reach the target programming state and thus threshold voltage distributions of the memory cell are maintained to be narrow. In such a case, a read-window margin of the memory cells is large, thus improving the reliability of reading operations.

In some aspects, the memory cell may require a high programming voltage to reach the target programming state. For example, the memory cell can correspond to a high state and requires a high threshold voltage. In such a case, it can take a long time for the programming voltage to reach the high programming voltage if the step pulse is small. The memory device may need to go through multiple rounds of programming to increase the programming voltage to the high programming voltage. In some aspects, a memory cell with a highest state has limited contributions to the read-window margin. For example, the memory cells of the memory device may have 8 states: P0-P7. As discussed in more detail below, a voltage distribution of memory cells of the state P7 has limited impact on the read-window margin, especially an upper tail voltage distribution of the memory cells. Therefore, increasing the step pulse of the memory cells corresponding to the state P7 can improve the programming speed without degrading the accuracy and the reliability of the read operation.

This Summary is provided merely for purposes of illustrating some aspects to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE DRAWINGS

The accompanying drawings are incorporated herein and form a part of the specification.

FIG. 6 illustrates an example of ISPP programming using seven exemplary states P1-P7, according to aspects of the present disclosure.

Figure 1:
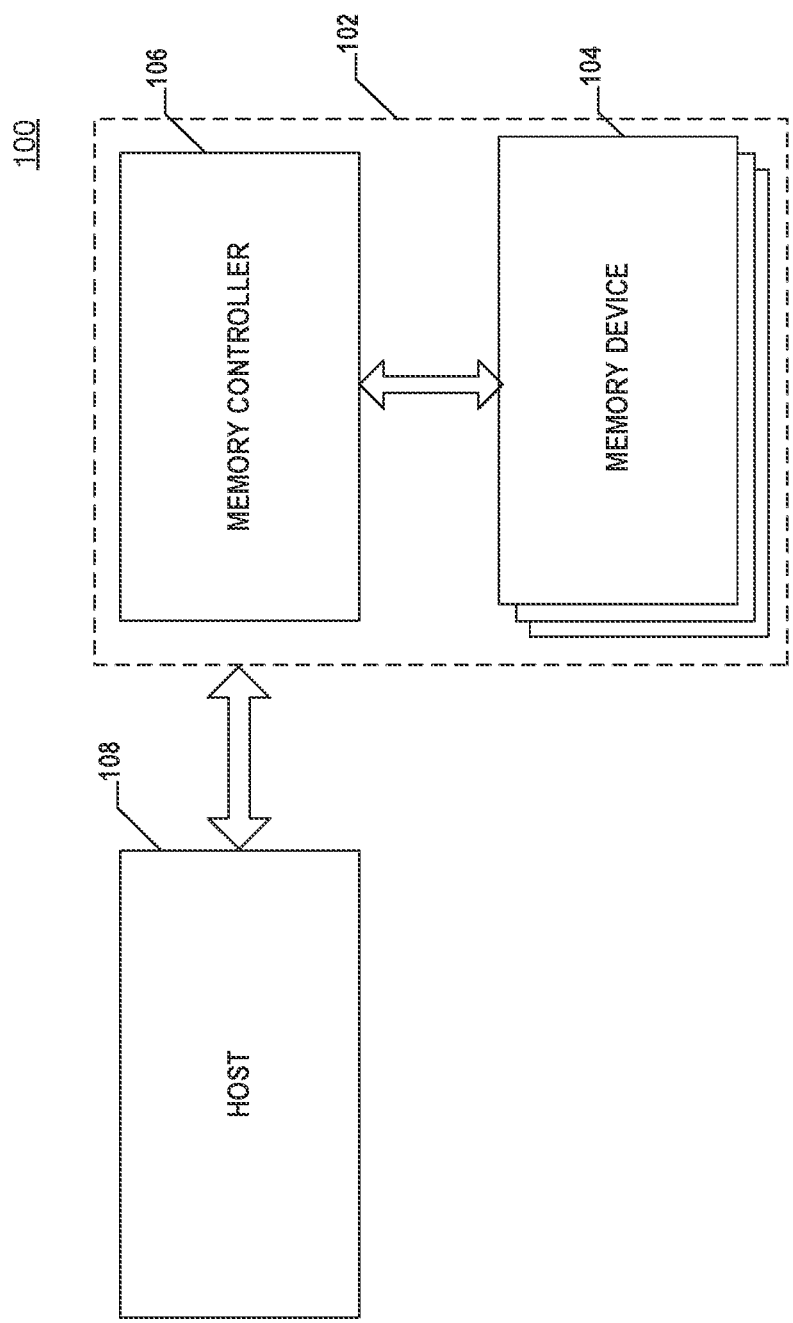
FIG. 1 illustrates an example system including a memory device, according to aspects of the present disclosure.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

Aspects of the present disclosure will be described with reference to the accompanying drawings.

DETAILED DESCRIPTION

Although specific configurations and arrangements are discussed, it should be understood that this is done for illustrative purposes only. A person skilled in the pertinent art will recognize that other configurations and arrangements can be used without departing from the spirit and scope of the present disclosure. It will be apparent to a person skilled in the pertinent art that the present disclosure can also be employed in a variety of other applications.

It is noted that references in the specification to "one embodiment," "an embodiment," "an example embodiment," "some aspects," etc., indicate that the embodiment described can include a particular feature, structure, or characteristic, but every embodiment can not necessarily include the particular feature, structure, or characteristic. Moreover, such phrases do not necessarily refer to the same embodiment. Further, when a particular feature, structure, or characteristic is described in connection with an embodiment, it would be within the knowledge of a person skilled in the pertinent art to affect such feature, structure, or characteristic in connection with other aspects whether or not explicitly described.

In general, terminology can be understood at least in part from usage in context. For example, the term "one or more" as used herein, depending at least in part upon context, can be used to describe any feature, structure, or characteristic in a singular sense or can be used to describe combinations of features, structures, or characteristics in a plural sense. Similarly, terms, such as "a," "an," or "the," again, can be understood to convey a singular usage or to convey a plural usage, depending at least in part upon context. In addition, the term "based on" can be understood as not necessarily intended to convey an exclusive set of factors and may, instead, allow for existence of additional factors not necessarily expressly described, again, depending at least in part on context.

As used herein, the term "nominal/nominally" refers to a desired, or target, value of a characteristic or parameter for a component or a process step, set during the design phase of a product or a process, together with a range of values above and/or below the desired value. The range of values can be due to slight variations in manufacturing processes or tolerances. As used herein, the term "about" indicates the value of a given quantity that can vary based on a particular technology node associated with the subject semiconductor device. Based on the particular technology node, the term "about" can indicate a value of a given quantity that varies within, for example, 10-30% of the value (e.g., ±10%, ±20%, or 30% of the value).

FIG. 1 illustrates a block diagram of an exemplary system 100 having a memory device, according to some aspects of the present disclosure. System 100 can be a mobile phone, a desktop computer, a laptop computer, a tablet, a vehicle computer, a gaming console, a printer, a positioning device, a wearable electronic device, a smart sensor, a virtual reality (VR) device, an argument reality (AR) device, or any other suitable electronic devices having storage therein. As shown in FIG. 1, system 100 can include a host 108 and a memory system 102 having one or more memory devices 104 and a memory controller 106. Host 108 can be a processor of an electronic device, such as a central processing unit (CPU), or a system-on-chip (SoC), such as an application processor (AP). The host 108 may also include memory interfaces for coupling to the memory system 102, and the memory interfaces may be configured to comply with the corresponding protocols (such as NVMe, PCIe, etc.). Host 108 can be configured to send or receive data to or from memory devices 104 through, for example, memory interface. In order to send or receive data to or from memory devices 104, host 108 can send instructions to memory system 102 besides the data.

Memory device 104 can be any memory device disclosed in the present disclosure. As disclosed below in detail, memory device 104 performs an advanced ISPP to improve the speed of programming the memory cells.

Memory controller 106 is coupled to memory device 104 and host 108 and is configured to control memory device 104, according to some implementations. Memory controller 106 can be implemented by microprocessors, microcontrollers (a.k.a. microcontroller units (MCUs)), central process units (CPUs), digital signal processors (DSPs), application-specific integrated circuits (ASICs), field-programmable gate arrays (FPGAs), programmable logic devices (PLDs), state machines, gated logic, discrete hardware circuits or their combinations, and other suitable hardware, firmware, and/or software configured to perform the various functions described below in detail.

Memory controller 106 can manage the data stored in memory device 104 and communicate with host 108. In some implementations, memory controller 106 is designed for operating in a low duty-cycle environment like secure digital (SD) cards, compact Flash (CF) cards, universal serial bus (USB) Flash drives, or other media for use in electronic devices, such as personal computers, digital cameras, mobile phones, etc. In some implementations, memory controller 106 is designed for operating in a high duty-cycle environment SSDs or embedded multi-media-cards (eMMCs) used as data storage for mobile devices, such as smartphones, tablets, laptop computers, etc., and enterprise storage arrays. Memory controller 106 can be configured to control operations of memory device 104, such as read, erase, and program operations.

Memory controller 106 can also be configured to manage various functions with respect to the data stored or to be stored in memory device 104 including, but not limited to bad-block management, garbage collection, logical-to-physical address conversion, wear leveling, etc. In some implementations, memory controller 106 is further configured to process error correction codes (ECCs) with respect to the data read from or written to memory device 104. Any other suitable functions may be performed by memory controller 106 as well, for example, formatting memory device 104. Memory controller 106 can communicate with an external device (e.g., host 108) according to a particular communication protocol. For example, memory controller 106 may communicate with the external device through at least one of various interface protocols, such as a universal serial bus (USB) protocol, a multimedia card (MMC) protocol, a peripheral component interconnection (PCI) protocol, a PCI-express (PCI-E) protocol, an advanced technology attachment (ATA) protocol, a serial-ATA protocol, a parallel-ATA protocol, a small computer small interface (SCSI) protocol, an enhanced small disk interface (ESDI) protocol, an integrated drive electronics (IDE) protocol, a Firewire protocol, etc.

Figure 2A:
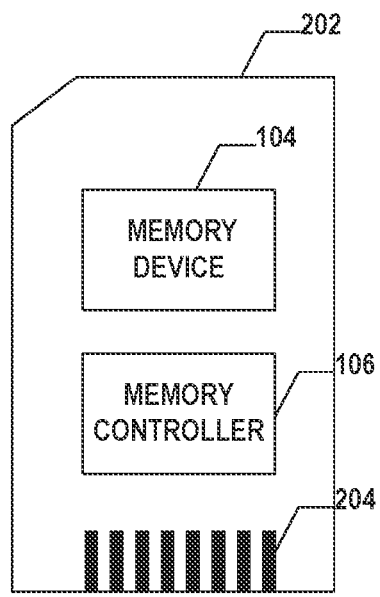
FIG. 2 illustrates an example block diagram of a memory device, according to aspects of the present disclosure.
Figure 2B:
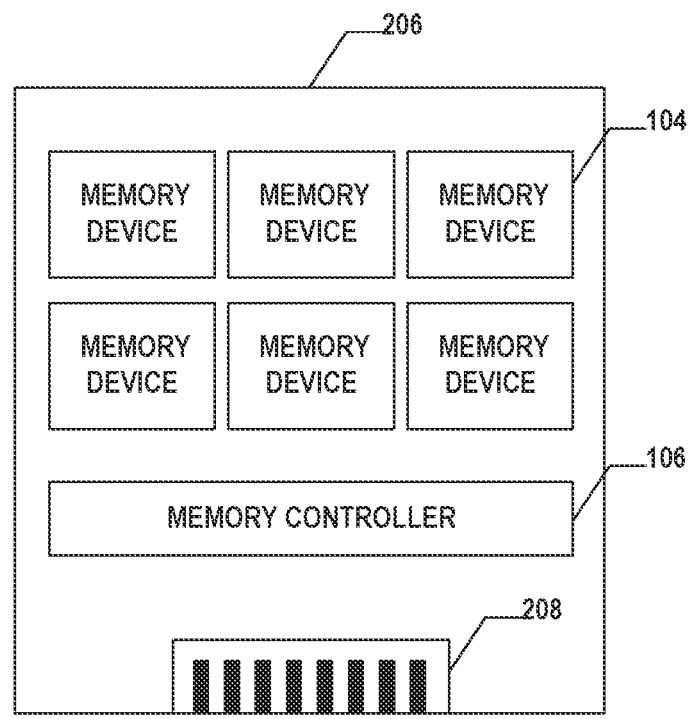

Memory controller 106 and one or more memory devices 104 can be integrated into various types of storage system, for example, be included in the same package, such as a universal Flash storage (UFS) package or an eMMC package. That is, memory system 102 can be implemented and packaged into different types of end electronic products. In one example as shown in FIG. 2A, memory controller 106 and a single memory device 104 may be integrated into a memory card 202. Memory card 202 can include a PC card (PCMCIA, personal computer memory card international association), a CF card, a smart media (SM) card, a memory stick, a multimedia card (MMC, RS-MMC, MMC micro), an SD card (SD, mini SD, micro SD, SDHC), a UFS, etc. Memory card 202 can further include a memory card connector 204 configured to couple memory card 202 to a host (e.g., host 108 in FIG. 1). In another example as shown in FIG. 2B, memory controller 106 and multiple memory devices 104 may be integrated into an SSD 206. SSD 206 can further include an SSD connector 208 configured to couple SSD 206 to a host (e.g., host 108 in FIG. 1).

Figure 3:
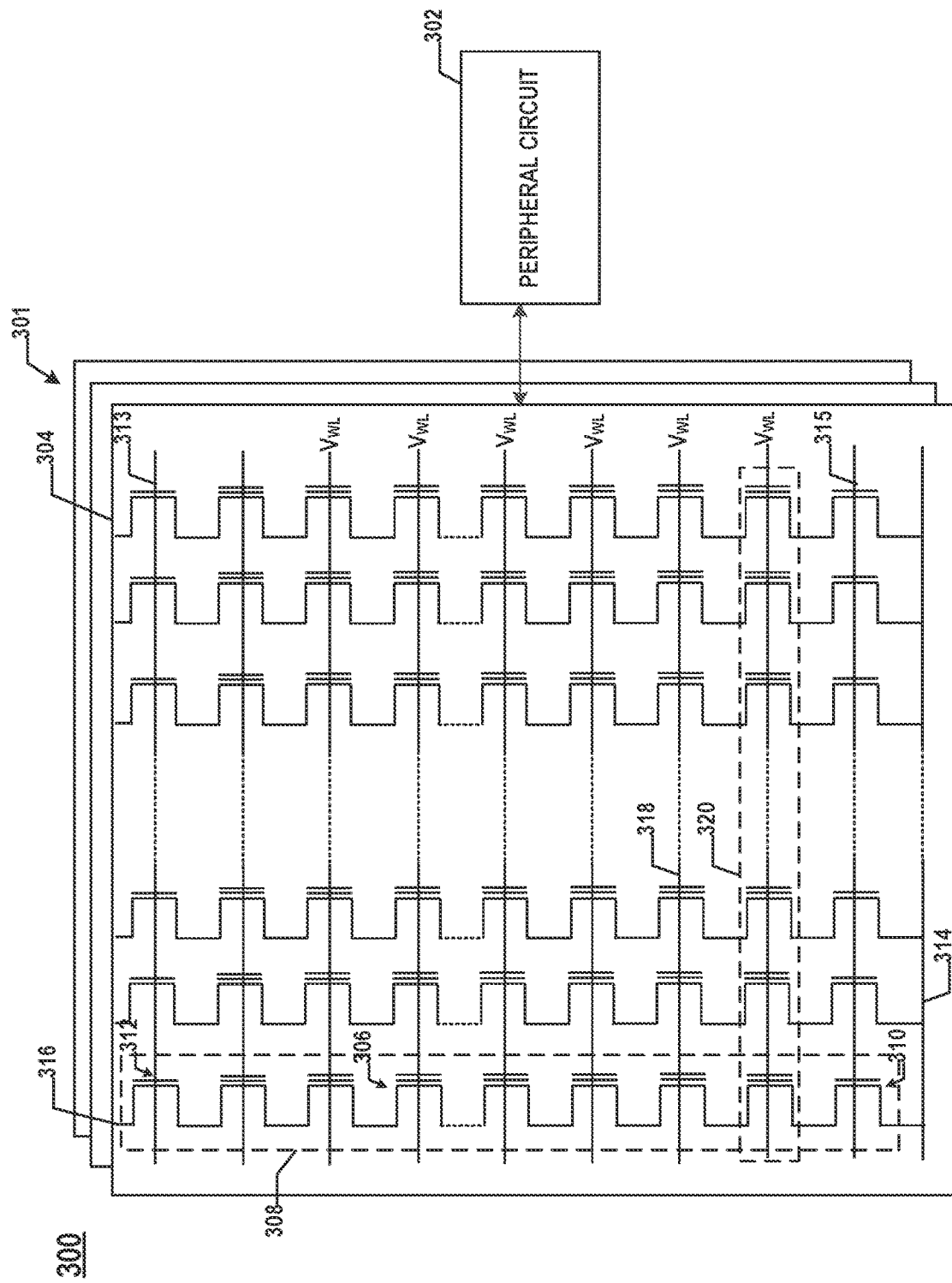
FIG. 3 illustrates an example schematic circuit diagram of a memory device, according to aspects of the present disclosure.

FIG. 3 illustrates a schematic circuit diagram of an exemplary memory device 300 including peripheral circuits 302, according to some aspects of the present disclosure. Memory device 300 can be an example of memory device 104 in FIG. 1. Memory device 300 can include a memory cell array 301 and peripheral circuits 302 coupled to memory cell array 301. Memory cell array 301 can be a NAND Flash memory cell array in which memory cells 306 are provided in an array of NAND memory strings 308. In some implementations, each NAND memory string 308 includes a plurality of memory cells 306 coupled in series and stacked vertically. Each memory cell 306 can hold a continuous, analog value, such as an electrical voltage or charge, that depends on the number of electrons trapped within a region of memory cell 306. Each memory cell 306 can be either a floating gate type of memory cell including a floating-gate transistor or a charge trap type of memory cell including a charge-trap transistor.

In some implementations, each memory cell 306 is a single-level cell (SLC) that has two possible memory states and thus, can store one bit of data. For example, the first memory state "0" can correspond to a first range of voltages, and the second memory state "1" can correspond to a second range of voltages. In some implementations, each memory cell 306 is capable of storing more than a single bit of data in more than two memory states. For example, the MLC can store two bits per cell (also known as multi-level cell (MLC)), three bits per cell (also known as triple-level cell (TLC)), or four bits per cell (also known as a quad-level cell (QLC)).

As shown in FIG. 3, each NAND memory string 308 can also include an SSG transistor 310 at its source end and a DSG transistor 312 at its drain end. SSG transistor 310 and DSG transistor 312 can be configured to activate select NAND memory strings 308 during read and program operations. In some implementations, the sources of NAND memory strings 308 in the same block 304 are coupled through a same source line (SL) 314. The drain of each NAND memory string 308 is coupled to a respective bit line 316, according to some implementations. In some implementations, each NAND memory string 308 is configured to be selected or unselected by applying a DSG select voltage or a DSG unselect voltage to the gate of respective DSG transistor 312 through one or more DSG lines 313 and/or by applying an SSG select voltage or an SSG unselect voltage to the gate of respective SSG transistor 310 through one or more SSG lines 315. NAND memory string 308 can thus become a select NAND memory string or an unselect NAND memory string.

As shown in FIG. 3, NAND memory strings 308 can be organized into multiple blocks 304. In some implementations, each block 304 is the basic data unit for erase operations, i.e., all memory cells 306 on the same block 304 are erased at the same time. It should be understood that, in some implementations, the erase operation may be performed at the half-block level, at the quarter-block level, or at the level of any suitable number of blocks or any suitable number of fractions in a block. Memory cells 306 of adjacent NAND memory strings 308 can be coupled through word lines 318 that select which row of memory cells 306 is affected by read and program operations.

As shown in FIG. 3, memory cell array 301 can include an array of memory cells 306 in a plurality of rows and a plurality of columns in each block 304. One row of memory cells 306 corresponds to one or more pages, and one column of memory cells corresponds to one NAND memory string 308, according to some implementations. The plurality of rows of memory cells 306 can be respectively coupled to word lines 318, and the plurality of columns memory cells 306 can be respectively coupled to bit lines 316. During programming (i.e., writing), a programming voltage $V_{pgm}$ (e.g., a positive voltage pulse between 10 V and 20 V) can be applied on the control gate such that electronic charges (e.g., electrons) can be injected into the storage layer of the memory cell 306, and thereby increase the threshold voltage $V_{th}$ of the memory cell 306. The increased threshold voltage $V_{th}$ can correspond to a state P1.

A NAND flash memory can be configured to operate in a single-level cell (SLC) mode. To increase storage capacity, a NAND flash memory can also be configured to operate in a multi-level cell (MLC) mode, a triple-level cell (TLC) mode, a quad-level cell (QLC) mode, or a combination of any of these modes. In the SLC mode, a memory cell stores "1" bit and has two logic states ("states"), i.e., states ER and P1. In the MLC mode, a memory cell stores 2 bits, and has four states, i.e., states ER, P1, P2, and P3. In the TLC mode, a memory cell stores 3 bits, and has eight states, i.e., states ER, and states P1-P7. In the QLC mode, a memory cell stores 4 bits and has 16 states.

Figure 4A:
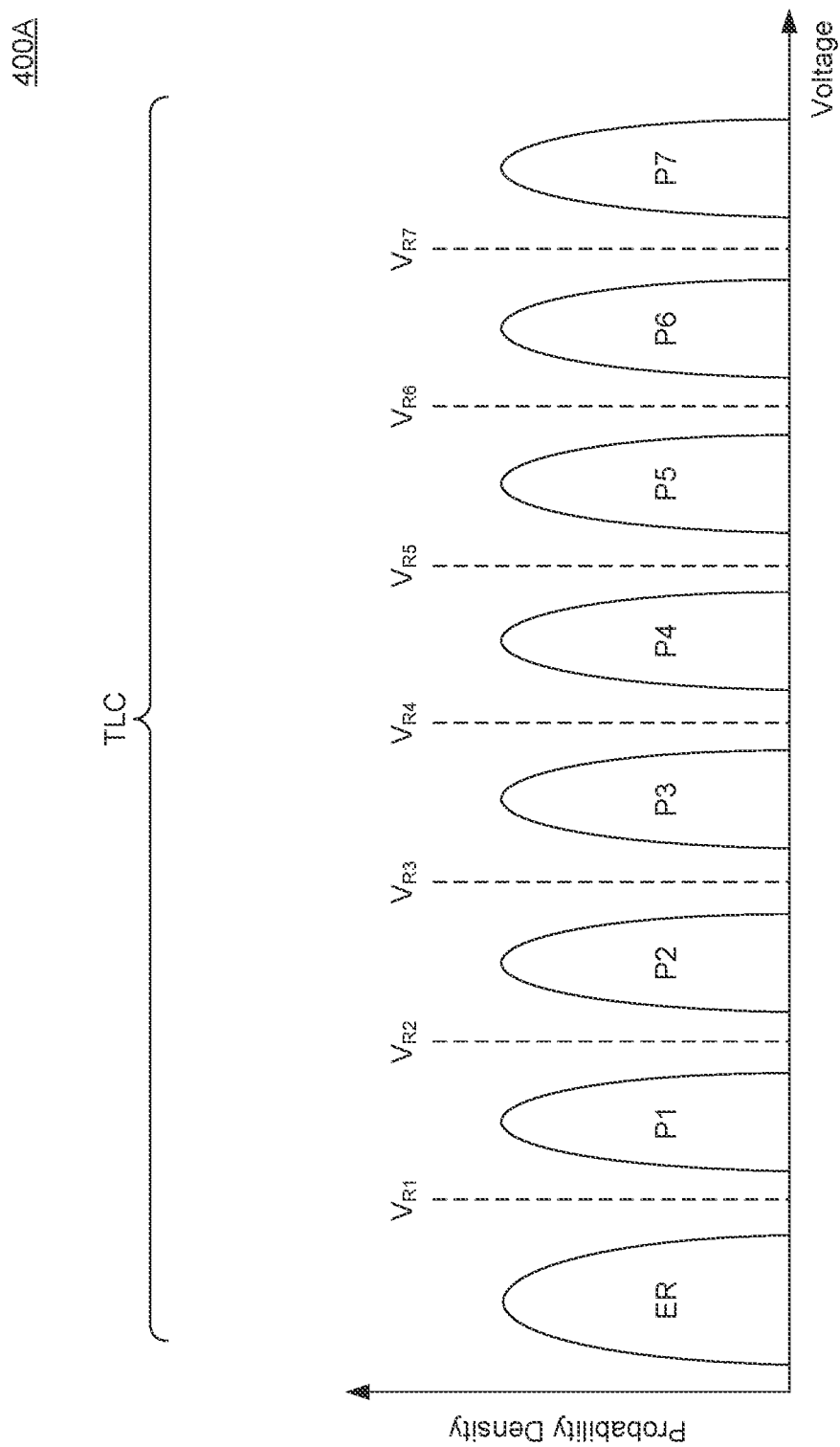
FIGS. 4A, 4B and 4C illustrate example threshold voltage distributions of a memory device, according to aspects of the present disclosure.

FIG. 4A illustrates a threshold voltage $V_{th}$ distribution of a NAND flash memory programmed in the triple-level cell (TLC) mode, according to some aspects of the present disclosure. Due to various variations, each state of the memory cells includes a range of threshold voltages $V_{th}$ (x-axis), where the threshold voltage $V_{th}$ distribution of each state can be represented by a probability density (y-axis). In some aspects, the eight states can be programmed by using an incremental step pulse programming (ISPP) scheme in which the programming voltage $V_{pgm}$ can be incrementally increased by adding a step pulse $V_{step}$. Accordingly, the eight TLC states can be programmed from the state P1 with a lower threshold voltage to the state P7 with a highest threshold voltage. In some aspects, the eight TLC states can reach the state P7 in a shorter amount of time using an ISPP with a larger step pulse $V_{step}$.

In some aspects, to increase the programming speed, memory cells in the same memory page 322 (FIG. 3) shared with the same word line (e.g., same control gates) can be programmed simultaneously. After each ISPP pulse, a verify operation can be performed. In some aspects, the memory cells which have reached a target state (i.e., a target threshold voltage) can be inhibited from further programming by controlling the TSG 314 and/or LSG 312. In some aspects, memory cells can also be inhibited from further programming by raising the voltage on the corresponding bit lines.

After programming, the eight TLC states ER and P1-P7 can be verified by using one or more read reference voltages $V_{R1}$-$V_{R7}$. By applying one or more of the read reference voltages $V_{R1}$-$V_{R7}$ to the word line coupled to a target memory cell, the range of the memory cell's threshold voltage $V_{th}$ can be determined. For example, to verify if a target memory cell is at state ER, the read reference voltage $V_{R1}$ can be used. If the target memory cell is at state ER, the threshold voltage $V_{th}$ of the target memory cell is lower than the read reference voltage $V_{R1}$. The target memory cell can be switched on and form a conductive path in the channel. If the target memory cell is at any one of the states P1-P7, the threshold voltage $V_{th}$ of the target memory cell is higher than the read reference voltage $V_{R1}$. The target memory cell is thereby switched off. By measuring or sensing the current through the target memory cell at the corresponding bit line, the threshold voltage $V_{th}$ or the state of the target memory cell can be verified.

Figure 4B:
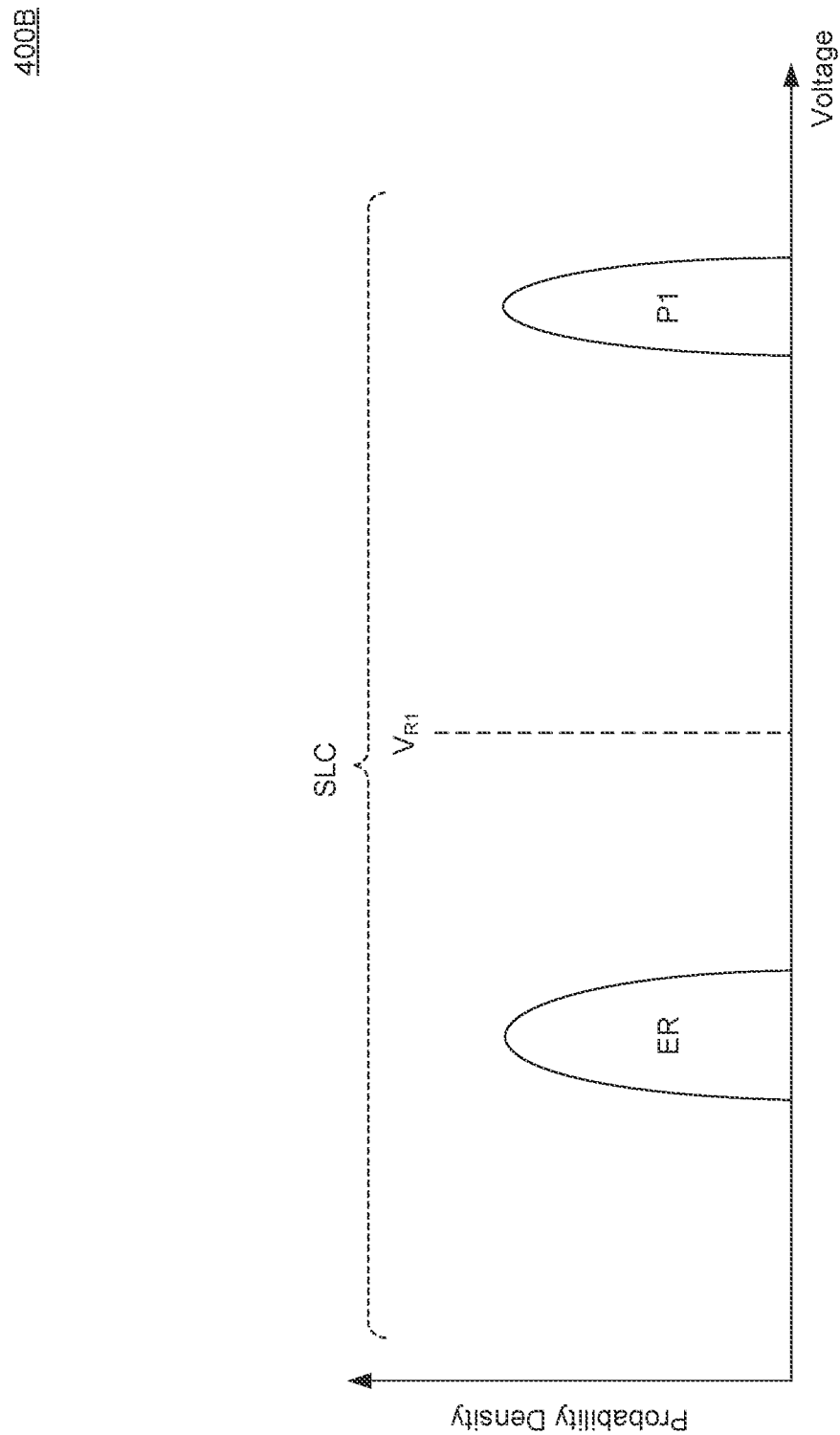
Figure 4C:
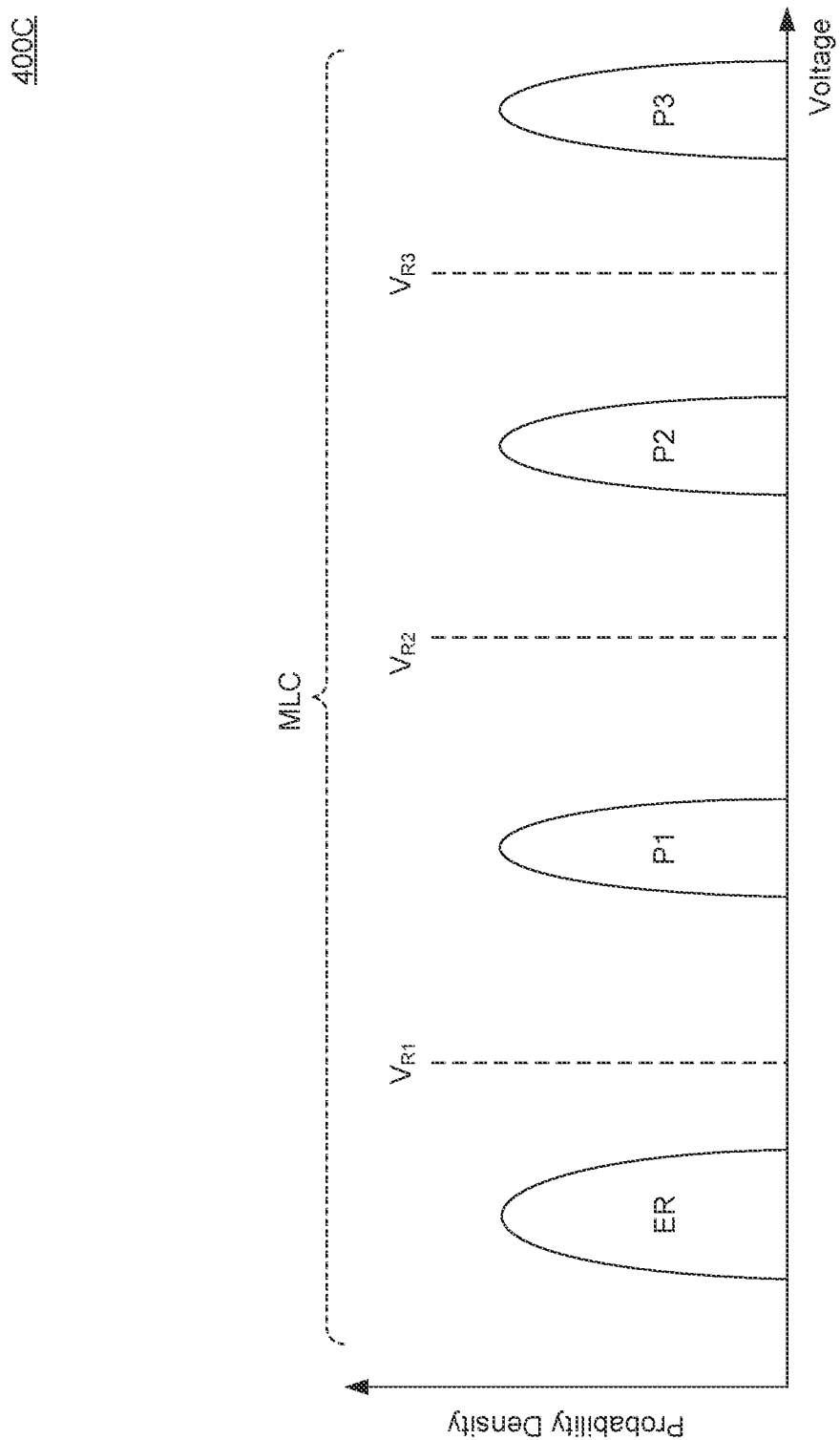

As described above, to determine the two states ER and P1 stored in the SLC mode as shown in FIG. 4B, only the read reference voltage $V_{R1}$ is needed. To determine the four states ER and P1-P3 in the MLC mode as shown in FIG. 4C, the read reference voltages $V_{R1}$, $V_{R2}$, and $V_{R3}$ can be used. To determine the eight states ER and P1-P7 for the TLC mode as shown in FIG. 4A, the read reference voltages $V_{R1}$-$V_{R7}$ can be used. For example, in the TLC mode, the threshold voltage of state ER is below $V_{R1}$, and the threshold voltage of state P7 is above $V_{R7}$, where the threshold voltages of state P1 are between $V_{R1}$ and $V_{R2}$. States P2-P6 can be determined similarly.

In some aspects, to improve reading and programming speed, multiple memory pages ("physical pages") can be read or programmed simultaneously. In MLC, TLC, or QLC mode, each memory page can be read or programmed based on one or more logic pages. For example, in the TLC mode of 3 bits per memory cell, a memory page can be programmed based on 3 logic pages, e.g., a lower page, a middle page, and an upper page.

In some aspects, the memory device can increase the step pulse $V_{step}$ to improve the programming speed of the memory device, as disused above. In such a case, the threshold voltage $V_{th}$ distributions shift to the right. Specifically, lower bounds of the threshold voltage $V_{th}$ distributions of P1-P7 slightly shift to the right or remain unchanged, but upper bounds of the threshold voltage $V_{th}$ distributions of P1-P7 shift to the right significantly. Therefore, gaps between the threshold voltage $V_{th}$ distributions become smaller and the read-window margin of the memory device becomes smaller, which decreases the reading accuracy of the memory device.

In some aspects, the memory device can increase the step pulse $V_{step}$ of memory cells of the state P7. In such a case, the threshold voltage $V_{th}$ distribution of the state P7 shifts to the right and the threshold voltage $V_{th}$ distributions of all other states remain the same. Because the state P7 is the highest state, the shift of the threshold voltage $V_{th}$ distribution of the state P7 does not change the read-window margin of the memory device and thus does not impact the reading accuracy of the memory device. Phrased differently, because the memory device determines a memory cell to be in the state P7 when the threshold voltage is higher than $V_{R7}$, shifting the threshold voltage $V_{th}$ distribution of the state P7 to the right does not change results of reading the memory cells. Therefore, the memory device can improve the programming speed without sacrificing the accuracy and reliability by increasing the step pulse $V_{step}$ of memory cells of the highest state, such as the state P7. It is worth noting that the memory device can also support other modes, such as the SLC, the MLC, quad-level cell (QLC), etc. For example, in the QLC mode, the highest state is a state P15 and the memory device can increase the step pulse $V_{step}$ of memory cells of the state P15 to improve the programming speed.

In some aspects, the memory device can increase the step pulse $V_{step}$ of memory cells of the states that are close to the highest state. For example, in the TCL mode, the memory device can increase the step pulse $V_{step}$ of memory cells of the states P5 and P6 as well. In such a case, the programming speed of the memory device can be further improved. On the other hand, the read-window margins between the states P5 and P6 and the read-window margins between the states P6 and P7 would likely decrease because of the increased step pulse $V_{step}$. For another example, in the QLC mode, the memory device can increase the step pulse $V_{step}$ of memory cells of the states P10-P14 as well. In such a case, the programming speed of the memory device can be further improved. On the other hand, the read-window margins among states P10-P15 would likely decrease because of the increased step pulse $V_{step}$.

Figure 5:
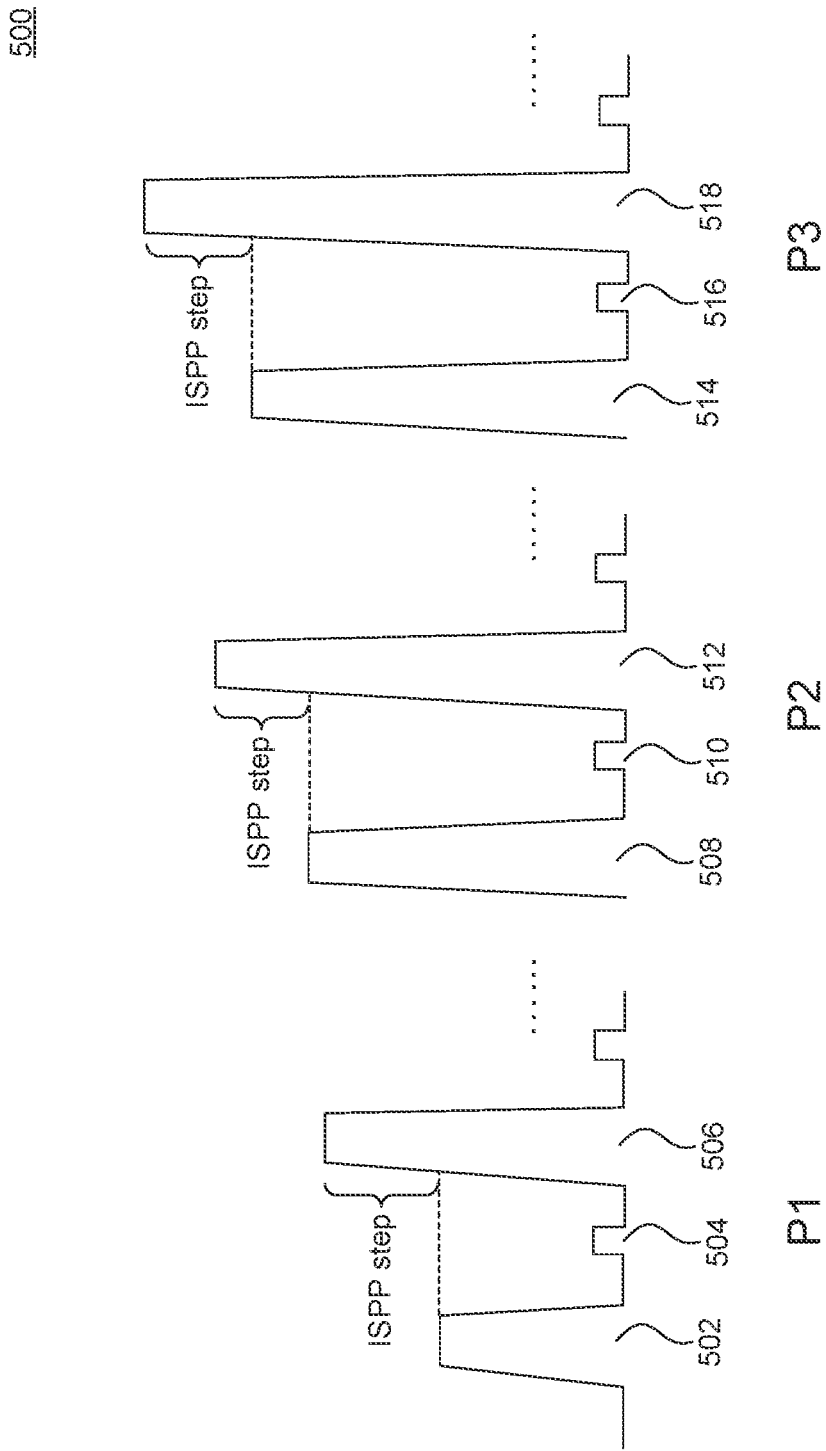
FIG. 5 illustrates an example of ISPP programming with a fixed step pulse, according to aspects of the present disclosure.

FIG. 5 illustrates an example 500 of programming with a fixed step pulse, according to aspects of the present disclosure. FIG. 5 can be performed by elements of FIGS. 1, 2, and 3. The example 500 can be performed by a memory system (for example, the memory system 102 of FIG. 1).

In some aspects, during programming, the memory device can apply different programming voltages to memory cells to program the memory cells into different states. For example, as shown in FIG. 5, the memory cell may have a target state of the state P1. In such a case, the memory device can apply a first programming voltage 502 to the memory cell to program the memory cell to the state P1. As shown in FIG. 4, a voltage range corresponds to the state P1. Therefore, the memory device applies a P1 reference voltage 504 to verify whether the threshold voltage of the memory cell satisfies the voltage range. If the threshold voltage of the memory cell satisfies the voltage range, the programming of the memory cell is complete. For example, the memory device may determine that the threshold voltage of the memory cell is within the voltage range and therefore satisfies the voltage range. For another example, the memory device may determine that the threshold voltage of the memory cell is higher than a target voltage and therefore satisfies the voltage range. In some aspects, the target voltage can be a lower bound of the voltage range. In some aspects, if the state P1 is the target state of the memory cell, the memory device inhabits the memory cell when the state P1 programming of the memory cell is complete. Thus, programming voltages later applied to the memory cell will not further program the memory cell. If the state P1 is not the target state of the memory cell, the memory device does not inhabit the memory cell and the memory cell will be programmed into higher states in further programming. On the other hand, the memory device may determine that the threshold voltage of the memory cell does not satisfy the voltage range. For example, the memory device may determine that the threshold voltage of the memory cell is outside the voltage range. For another example, the memory device may determine that the threshold voltage of the memory cell is lower than the target voltage. In either case, the memory device increases the programming voltage by a step pulse, such as an ISPP step, and applies the increased programming voltage to the memory cell. For example, the memory device increases the first programming voltage 502 to a second program voltage 506 by a step pulse, such as the ISPP step. The memory device then applies the second P1 programming voltage 506 to the memory cell, after which the memory device verifies whether the threshold of the memory cell satisfies the voltage range. The memory device repeats the programming process until the threshold of the memory device satisfies the voltage range. The programming operations that apply the programming voltage in an incremental manner as discussed above are also referred to as ISPP.

In some aspects, the memory device can determine a size of the step pulse based on a number of states in the memory device. For example, a step pulse of a memory device with 8 states, i.e., in the TLC mode, can be larger than that of a memory device with 16 states, i.e., in the QLT mode. For the memory device with a larger number of states, it is more difficult to distinguish memory cells in different states. Therefore, such memory device requires finer ISPP operations supported by a smaller step pulse.

In some aspects, the target state of the memory cell can be the state P2. The memory device can programs the memory cell to a threshold voltage that may correspond to the state P1 prior to programming to the state P2. For example, when programming memory cells with a target state P1, the memory device also programs memory cells with other target states, such as the memory cell with the target state P2, given that the memory cell is not inhabited. The memory cell can program the memory cell using the first program voltage 502 and the second program voltage 506 as discussed above. The memory device can apply the reference voltage 504 to the memory cells with the target state P1 to verify, but not to memory cells with the target state P2. For example, the memory device can verify that the memory cells with the target state P1 are programmed to the state P1 using the reference voltage 504. In such a case, the memory device can assume that the memory cell with the target state P2 is programmed to have the threshold voltage that correspond to the state P1 without verifying using the reference voltage 504. In other words, the memory device can assume that the memory cell with the target state P2 is programmed to the state P1 by verifying the memory cells with the target state P1. This is because the memory cell with the target state P2 is programmed using the first program voltage 502 and the second program voltage 506 in a similar way as the memory cells with the target state P1. After programming the memory cells to the state P1, the memory device can apply a first programming voltage 508 to the memory cell to program the memory cell to the state P2. As shown in FIG. 4, the voltage range corresponding to the state P2 includes higher voltage values compared with the state P1. Thus, the first programming voltage 508 is larger than the first programming voltage 502. The memory device can apply a reference voltage 510 to verify whether the threshold voltage of the memory cell satisfies the voltage range of the state P2. If the threshold voltage of the memory cell satisfies the voltage range of the state P2, the programming of the memory cell is complete. In some aspects, the memory device inhabits the memory cell if the state P2 is the target state of the memory cell. Thus, the memory device will not apply programming voltages to the memory cell in further programming. On the other hand, if the threshold voltage of the memory cell does not satisfy the voltage range of the state P2, the memory device can increase the programming voltage by a step pulse and applies the increased programming voltage to the memory cell. For example, the memory device increases the first programming voltage 508 to a second program voltage 512 by a step pulse, such as the ISPP step. The memory device then applies the second programming voltage 512 to the memory cell, after which the memory device verifies whether the threshold of the memory cell satisfies the voltage range of the state P2. The memory device repeats the programming process until the threshold of the memory device satisfies the voltage range of the state P2. In some aspects, the step pulse of programming the memory cell to the P1 state is the same as the step pulse of programming the memory cell to the P2 state. In other words, the programming uses ISPP with a fixed step pulse, e.g., the ISPP step of FIG. 5.

In some aspects, when the memory device programs memory cells with the target state P2, the memory device also programs other memory cells with a higher target state, such as memory cells with a target state P3. However, the memory device can assume, based on programming of the memory cells with the target state P2, that the memory cells with the higher target state are programmed to the state P2 without verifying using the reference voltage 510, as similarly discussed above.

In some aspects, the memory device can skip memory cells with lower target states, such as the state P1. For example, one or more memory cells may complete the programming to the state P1 and inhabited. In such a case, the memory cell can skip the one or more memory cells when programming with a higher target state, such as the states P2, P3, etc.

In some aspects, the target state of the memory cell can be the state P3. Similar to the discussions above, prior to programming the memory cell to the state P3, the memory device programs the memory cell when programing the memory cells with the target state P1 and the memory cells with the target state P2. In other words, the memory cell can program the memory cell using the first program voltage 502, the second program voltage 506, the first program voltage 508, and the second program voltage 512 without verifying using the reference voltages 504 and 510, as discussed above. The memory device can assume that the memory cell is in the state P2 when the memory cells with the target state P2 are verified to be in the state P2. Subsequently, the memory device can apply a first programming voltage 514 to the memory cell to program the memory cell to the state P3. Similar to the states P1 and P2 discussed above, a third voltage range corresponds to the state P3. Therefore, the memory device can apply a reference voltage 516 to verify whether the threshold voltage of the memory cell satisfies the voltage range of the state P3. If the threshold voltage of the memory cell does not satisfy the voltage range of the state P3, the memory device can increase the programming voltage by a step pulse and applies the increased programming voltage to the memory cell. For example, the memory device increases the first programming voltage 514 to a second program voltage 518 by a step pulse, such as the ISPP step. The memory device then applies the second programming voltage 518 to the memory cell, after which the memory device verifies whether the threshold of the memory cell satisfies the voltage range of the state P3. The memory device repeats the programming process until the threshold of the memory device satisfies the voltage range of the state P3.

FIG. 6 illustrates an example of ISPP programming using seven exemplary states P1-P7, according to aspects of the present disclosure. FIG. 6 can be performed by elements of FIGS. 1, 2, and 3. The example 600 can be performed by a memory system (for example, the memory system 102 of FIG. 1).

In some aspects, a memory device performs programming operation one or more times for one state. As shown in FIG. 6, the memory device performs the verification operation three times in pulses No. 1-3 for the state P1. In some aspects, the memory device programs memory cells with target states P1-P7 according to the state P1. Specifically, the memory device can apply program voltages, such as the first program voltage 502 and the second program voltage 506, to the memory cells with target states P1-P7. The memory device then verifies using a reference voltage, such as the reference voltage 504, that P1 memory cells of the memory cells with target states P1-P7 satisfy the state P1. After that, the memory device inhabits the P1 memory cells, which correspond to a target state P1, because the P1 memory cells have reached their target state. The memory device then continues to program memory cells with target states P2-P7 according to the state P2 in pulses No. 3-5. After that, the memory device inhabits P2 memory cells with a target state P2. Note that the pulse No. 3 is counted twice, both in state P1 programing and in state P2 programming. In similar manners, the memory device continues to program P3 memory cells, P4 memory cells, P5 memory cells, P6 memory cells, and P7 memory cells in pulses No. 5-17.

In some aspects, the highest state requires a greatest number of pulses to complete programming. For example, as shown in FIG. 6, the state P7 verification operation takes five pulses, which is more than any other states. As discussed above, the memory device can increase the step pulse for the state P7 programming to improve the programming speed. For example, the step pulse of the states P1-P6 can be 0.4 volts. The memory device can increase the step pulse to 0.6 volts for the state P7 programming. With the increased step pulse, the state P7 programming may complete in less than five pulses.

In some aspects, the second highest state generally requires a large number of pulses to complete. For example, as shown in FIG. 6, the state P6 verification operation takes four pulses, which is more than any other states, except for the state P7. Therefore, increasing the step pulse for the state P6 programming can also improve the programming speed. Although the reading accuracy may be impacted due to shifting of a voltage distribution of memory cells of the state P6, it can still be worthwhile to increase the step pulse for the state P6 programming if the impact on the reading accuracy is tolerable. In some aspects, the step pulses of the state P6 programming and the state P7 programming can be different. For example, the step pulse of the states P1-P5 can be about 0.4 volts. The memory device can increase the step pulse to about 0.5 volts for the state P6 programming. The memory device can further increase the step pulse to about 0.6 volts for the state P7 programming. In such a case, the voltage distribution of memory cells of the state P6 experiences less shifting than that of memory cells of the state P7. In other aspects, increased amounts of the step pulses of the state P6 programming and the state P7 programming can be different. For example, the step pulse of the states P1-P5 can be 0.4 volt. The memory device can increase the step pulse by 0.1 volts to 0.5 volts for the state P6 programming. The memory device can further increase the step pulse again by 0.2 volts to 0.7 volts for the state P7 programming. In other words, an incremental amount of the step pulse depends on the state.

In some aspects, in the pulse No. 1, the memory device applies a programming voltage, such as the first programming voltage 502 to the memory cells with target states P1-P7. The memory device then determines that one or more memory cells with the target state P1 do not verify successfully. For example, threshold voltages of the one or memory cells are not within a voltage range of the state P1, such as the voltage range shown in FIG. 4. In such a case, the memory device increases a programming voltage by a step pulse, as discussed in FIG. 5, and applies the increased programming voltage in the pulse No. 2. Similarly, the verification for state P1 can fail again. The memory device can then increase the programming voltage once again, and apply the again increased programming voltage to the memory cells in the pulse No. 3. The memory device then determines that the threshold voltages of the memories cells with the target state P1 are within the voltage range of the state P1. At such a point, the state P1 programming completes. The memory device can inhabit P1 memory cells that have the target state P1 and prevent the state P1 memory cells to be further programmed. In some aspects, the memory device verifies the one or more memory cells with the target state P1, not memory cells with target states P2-P7, as similarly discussed above. In similar manners, the memory device can perform state P2 programming in pulses No. 3-5; perform state P3 programming in pulses No. 5 and 6; perform state P4 programming in pulses No. 6-8; perform state P5 programming in pulses No. 8-10; perform state P6 programming in pulses No. 10-13; and perform state P7 programming in pulses No. 13-17. It is worth noting that when performing lower state programming, memory cells with higher states are also programmed. For example, in pulses No. 3-5, memory cells of states P3-P7 are also programmed.

In some aspects, the example 600 can be a typical distributions of a number of pulses required for each state programming. For example, the example 600 can be generated by testing a large number of memory devices or via simulations. The example 600 can represent behaviors of most memory devices given that some memory devices can perform differently.

Figure 7:
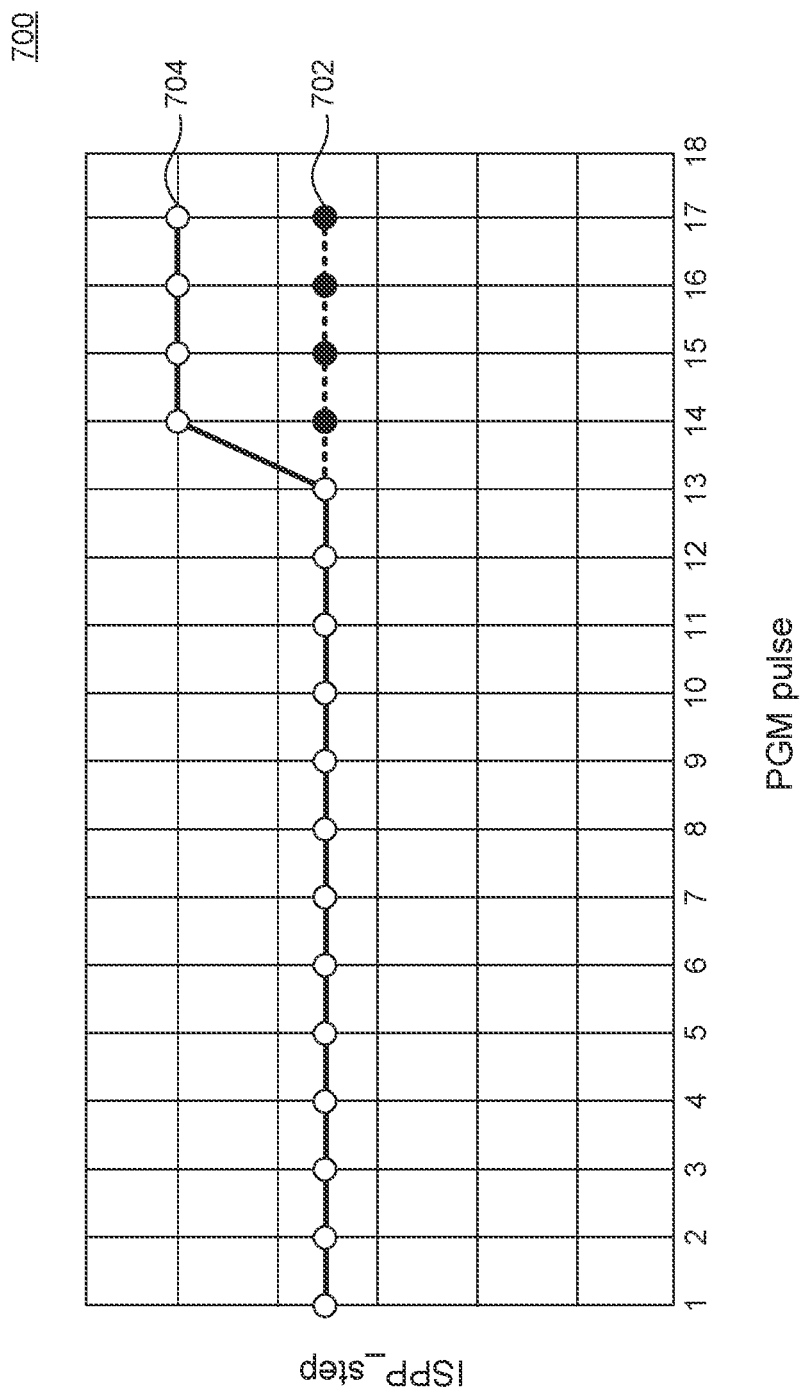
FIG. 7 illustrates an example of ISPP programming with variable step pulse.

FIG. 7 illustrates an example of ISPP programming with variable step pulse, according to aspects of the present disclosure. FIG. 7 can be performed by elements of FIGS. 1, 2, and 3. The example 700 can be performed by a memory system (for example, the memory system 102 of FIG. 1).

FIG. 7 includes two types of ISPP programming: fixed step programming 702 and variable step programming 704. In the fix step programming 702, the memory device increases programming voltage by a fix step pulse, such as the ISPP step shown in FIG. 5 or 0.4 volts as discussed in FIG. 6. This can be employed when the memory device determines that threshold voltages of one or more memory cells are not within a voltage range. On the other hand, in the variable step programming 704, the memory device can determine to increase the step pulse when a voltage increase condition is met.

In some aspects, the memory device can determine that the voltage increase condition is met when a predetermined state programming is complete. For example, the memory device can determine that the voltage increase condition is met when the state P6 or the state P5 programming is complete. Here, the predetermined state can be the state P6 or the state P5.

In some aspects, the memory device can determine that the voltage increase condition is met when a predetermined state programming starts a verification and failed for the first time. For example, after the memory device starts the state P6 or the state P7 programming and applies a reference voltage to the memory cells, the memory device can determine that the voltage increase condition is met if threshold voltages of the memory cells are not within the voltage range of the state P6 or the state P7. In other words, the voltage increase condition is met when the predetermined state programming starts.

In some aspects, the memory device can determine that the voltage increase condition is met after a predetermined number of pulses/programming have been performed. For example, the memory device can determine that the voltage increase condition is met after the memory device performs 13 pulses/programming as shown in FIG. 6. The idea is to constrain a total number of pulses/programming. When the memory device determines that the programming of the states P1-P7 has not yet completed as the predetermined number of pulses/programming, the memory device can increase the step pulse to accelerate the programming process. The predetermined number of pulses/programming, such as 13 pulses/programming, can correspond to a state, such as the state P7. For example, as shown in FIG. 6, the memory device normally or is expected to start the state P7 programming after 13 pulses/programming.

Figure 8:
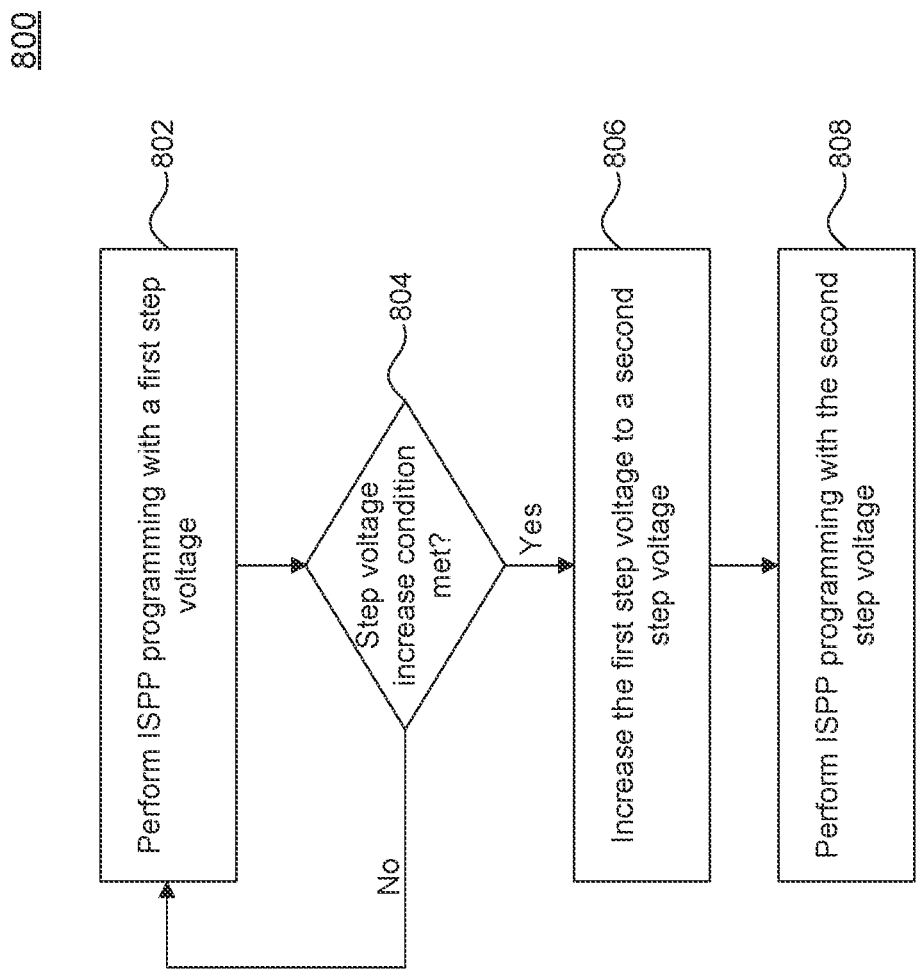
FIG. 8 illustrates an example method of ISPP programming with variable step pulse, according to aspects of the present disclosure.

FIG. 8 illustrates an example method of ISPP programming with variable step pulse, according to aspects of the present disclosure. As a convenience and not a limitation, FIG. 8 can be performed by elements of FIGS. 1, 2, and 3. The example method 800 can be performed by a memory system (for example, the memory system 102 of FIG. 1). The example 800 can also be performed by the computer system 900 of FIG. 9. Example 800 is not limited to the specific aspects depicted in those figures and other systems can be used to perform the method, as will be understood by those skilled in the art. It is to be appreciated that not all operations may be needed, and the operations may not be performed in the same order as shown in FIG. 8.

At 802, the memory device performs ISPP programming with a first step voltage to a memory cell. For example, the first step voltage can be a voltage V1. The memory device can apply a first programming voltage, such as a voltage $V_{pgm}$, to the memory cell. The memory device then applies a reference voltage to the memory cell to obtain a threshold voltage of the memory cell. If the threshold voltage is not within a voltage range of a programming state, the memory device can increase the first programming voltage by the first step voltage to a second programming voltage, such as V1+$V_{pgm}$ for example. In some aspects, the memory device can determine that the threshold voltage of the memory cell is within the voltage range of the programming state of the memory cell. If the programming state is the same as a target state of the memory cell, the programming completes and the process finishes. Otherwise, the memory device continues to program the memory cell towards the target state and the control moves to 804.

At 804, the memory device determines whether a voltage increase condition is met. As discussed above, the memory device can determine in three ways. First, the memory device can determine whether a predetermined state programming is complete. For example, the memory device may determine that the state P6 programming is complete at 802. In such a case, the step voltage increase condition is met at 804. Second, the memory device can determine whether a predetermined state programming has started. For example, the memory device may determine that the state P7 programming started at 802 and the threshold voltage is not within a voltage range of the state P7. In such a case, the step voltage increase condition is met at 804. Third, the memory device can determine whether a predetermined number of pulses/programming have been performed. For example, the memory device may determine that the ISPP programming at 802 is the 13$^{th}$ pulse/programming. In such a case, the step voltage increase condition is met at 804. When the step voltage increase condition is met, the control moves to 806.

At 806, the memory device increases the first step voltage to a second step voltage. For example, the first step voltage can be 0.4 volts and the second step voltage can be 0.6 volts. In some aspects, an amount of voltage increase from the first step voltage to the second step voltage depends on a current state and/or a current number of pulses/programming. For example, if the memory device completed the state P6 programming or 13 pulses/programming at 802, the memory device can increase the first step voltage by 0.2 volts. If the memory device completed the state P5 programming or 10 pulses/programming at 802, the memory device can increase the first step voltage by 0.1 volts.

At 808, the memory device performs ISPP programming with the second step voltage to the memory cell. The memory device can determine a second threshold voltage of the memory cell and determine that the second threshold voltage is within the voltage range of the state of the memory cell. In such a case, the memory device can inhabit the memory cell and the programming of the memory cell completes. On the other hand, the memory device can determine that the second threshold voltage is not within the voltage range. In such a case, the memory device increases the programming voltage by the second step voltage and repeats the ISPP programming until the programming completes.

Referring back to 804, if the step voltage increase condition is not met, the control moves to 802, where the memory device repeats the ISPP programming with the first step voltage.

Figure 9:
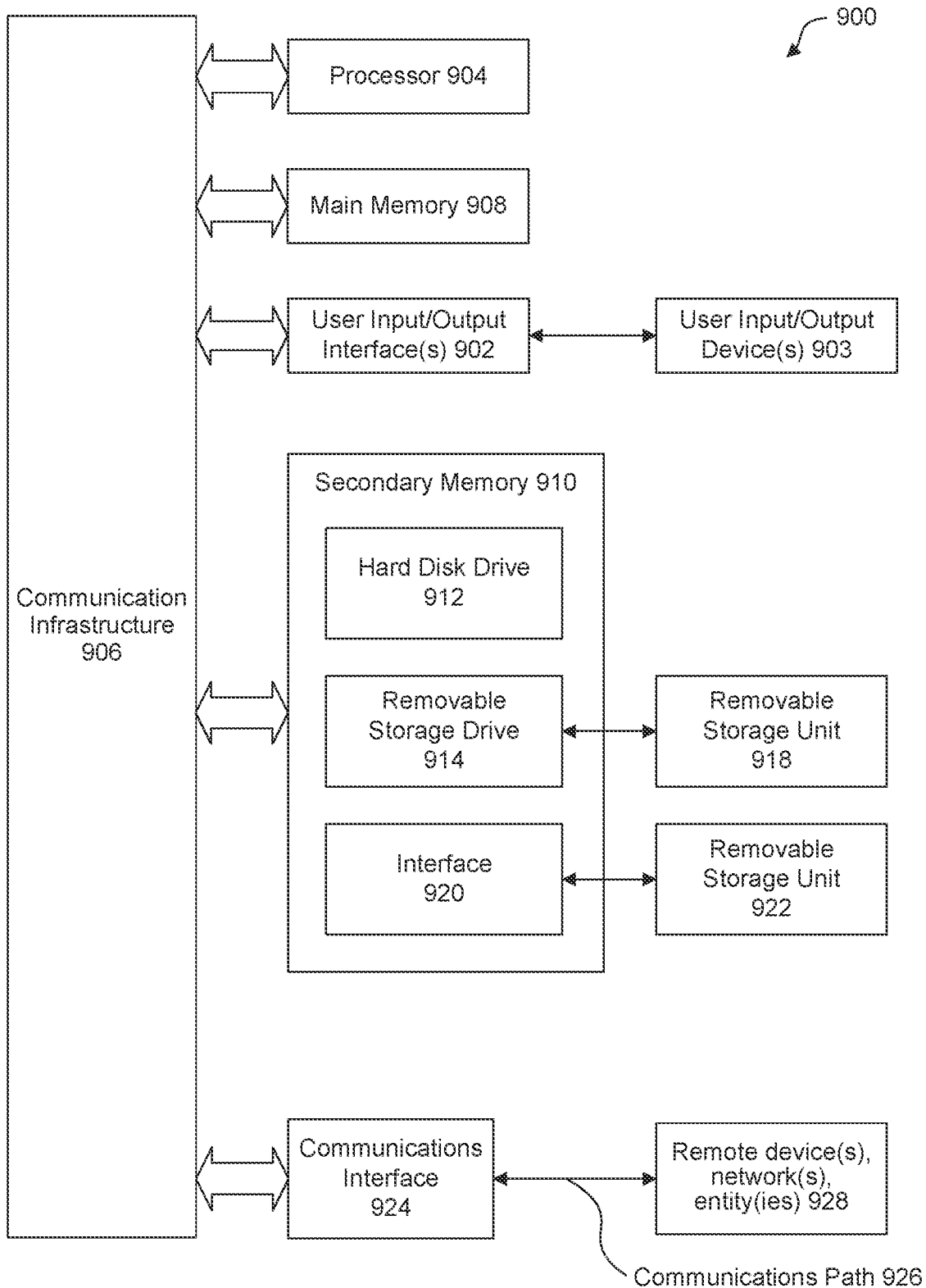
FIG. 9 is an example computer system for implementing some aspects of the disclosure or portion(s) thereof.

Various aspects can be implemented, for example, using one or more computer systems, such as computer system 900 shown in FIG. 9. Computer system 900 can be any well-known computer capable of performing the functions described herein such as the memory system 102 of FIG. 1. Computer system 900 includes one or more processors (also called central processing units, or CPUs), such as a processor 904. Processor 904 is connected to a communication infrastructure 906 (e.g., a bus.) Computer system 900 also includes user input/output device(s) 903, such as monitors, keyboards, pointing devices, etc., that communicate with communication infrastructure 906 through user input/output interface(s) 902. Computer system 900 also includes a main or primary memory 908, such as random access memory (RAM). Main memory 908 can include one or more levels of cache. Main memory 908 has stored therein control logic (e.g., computer software) and/or data.

Computer system 900 can also include one or more secondary storage devices or memory 910. Secondary memory 910 can include, for example, a hard disk drive 912 and/or a removable storage device or drive 914. Removable storage drive 914 can be a floppy disk drive, a magnetic tape drive, a compact disk drive, an optical storage device, tape backup device, and/or any other storage device/drive.

Removable storage drive 914 can interact with a removable storage unit 918. Removable storage unit 918 includes a computer usable or readable storage device having stored thereon computer software (control logic) and/or data. Removable storage unit 918 can be a floppy disk, magnetic tape, compact disk, DVD, optical storage disk, and/any other computer data storage device. Removable storage drive 914 reads from and/or writes to removable storage unit 918 in a well-known manner.

According to some aspects, secondary memory 910 can include other means, instrumentalities or other approaches for allowing computer programs and/or other instructions and/or data to be accessed by computer system 900. Such means, instrumentalities or other approaches can include, for example, a removable storage unit 922 and an interface 920. Examples of the removable storage unit 922 and the interface 920 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 900 can further include a communication or network interface 924. Communication interface 924 enables computer system 900 to communicate and interact with any combination of remote devices, remote networks, remote entities, etc. (individually and collectively referenced by reference number 928). For example, communication interface 924 can allow computer system 900 to communicate with remote devices 928 over communications path 926, which can be wired and/or wireless, and which can include any combination of LANs, WANs, the Internet, etc. Control logic and/or data can be transmitted to and from computer system 900 via communication path 926.

The operations in the preceding aspects can be implemented in a wide variety of configurations and architectures. Therefore, some or all of the operations in the preceding aspects can be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 900, main memory 908, secondary memory 910 and removable storage units 918 and 922, as well as tangible articles of manufacture embodying any combination of the foregoing. Such control logic, when executed by one or more data processing devices (such as computer system 900), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 9. In particular, aspects can operate with software, hardware, and/or operating system implementations other than those described herein.

In summary, the present disclosure describes various aspects of a memory storage system and methods of making the same.

Some embodiments of this disclosure relate to a method of operating a memory device having memory cells. The method comprises performing a first programming to a memory cell of the memory device with a first step voltage value and determining that a step voltage increase condition is met. The method further comprises performing a second programming to the memory cell with a second step voltage. The second step voltage is greater than the first step voltage value by an incremental voltage value.

Some embodiments of this disclosure relate to a memory system comprising memory device, wherein the memory device comprises memory cells and a peripheral circuit coupled to the memory cell. The peripheral circuit is configured to perform a first programming to a memory cell of the memory device with a first step voltage value and determine that a step voltage increase condition is met. The peripheral circuit is further configured to perform a second programming to the memory cell with a second step voltage value. The second step voltage value is greater than the first step voltage value by an incremental voltage value. The memory system further comprises controller coupled to the memory device and configured to control the memory device.

Some embodiments of this disclosure relate to a non-transitory computer-readable medium (CRM) comprising instructions to, upon execution of the instructions by one or more processors of a memory device having memory cells, cause the memory device to perform operations. The operation comprises performing a first programming to a memory cell of the memory device with a first step voltage value and determining that a step voltage increase condition is met. The operation further comprises performing a second programming to the memory cell with a second step voltage value. The second step voltage value is greater than the first step voltage value by an incremental voltage value.

Some embodiments of this disclosure relate to a memory device having memory cells comprising peripheral circuit and a memory array. The peripheral circuit, coupled to the memory array, is configured to perform a first programming to a memory cell of the memory device with a first step voltage value and determine that a step voltage increase condition is met. The peripheral circuit is further configured to perform a second programming to the memory cell with a second step voltage value. The second step voltage value is greater than the first step voltage value by an incremental voltage value.

The Summary and Abstract sections can set forth one or more but not all exemplary aspects of the present disclosure as contemplated by the inventor(s), and thus, are not intended to limit the present disclosure and the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects can perform functional blocks, steps, operations, methods, etc. using orderings different from those described herein.

References herein to "one aspect," "an aspect," "an example aspect," or similar phrases, indicate that the aspect described can include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

What is claimed is:

1. A method of operating a memory device having memory cells, the method comprising:
    performing a first programming to a memory cell of the memory device with a first step voltage value;
    determining that a step voltage increase condition is met; and
    performing a second programming to the memory cell with a second step voltage value, wherein the second step voltage value is greater than the first step voltage value by an incremental voltage value.

2. The method of claim 1, wherein determining that the step voltage increase condition is met further comprises:
    determining that a first voltage range includes a threshold voltage of the memory cell.

3. The method of claim 2,
    wherein the memory device includes the memory cells that are associated with N voltage states,
    wherein the first voltage range corresponds to a (N−1)th voltage state, and
    wherein the (N−1)th voltage state is a second highest state in the N voltage states.

4. The method of claim 1, wherein determining that the step voltage increase condition is met further comprises:
    determining that a threshold voltage is outside a second voltage range.

5. The method of claim 4,
    wherein the memory device includes the memory cells that are associated with N voltage states,
    wherein the second voltage range corresponds to a Nth voltage state,
    wherein the Nth voltage state is a highest state in the N voltage states, and
    wherein the determining that the threshold voltage is outside the second voltage range is a first verification of the Nth voltage state.

6. The method of claim 1, wherein determining that the step voltage increase condition is met further comprises:
    determining a number of programming operations performed on the memory cell; and
    determining that the number of programming operations exceeds a predetermined threshold.

7. The method of claim 1, further comprising:
    determining a number of programming operations performed to the memory cell; and
    determining the incremental voltage value based on the number of programming operations performed.

8. A memory device having memory cells comprising peripheral circuit and a memory array, the peripheral circuit, coupled to the memory array, configured to:
    perform a first programming to a memory cell of the memory device with a first step voltage value;
    determine that a step voltage increase condition is met; and
    perform a second programming to the memory cell with a second step voltage value, wherein the second step voltage value is greater than the first step voltage value by an incremental voltage value.

9. The memory device of claim 8, wherein to determine that the step voltage increase condition is met, the peripheral circuit is further configured to:
    determine that a first voltage range includes a threshold voltage of the memory cell.

10. The memory device of claim 9, wherein:
    the memory device includes the memory cells that are associated with N voltage states;
    the first voltage range corresponds to a (N−1)th voltage state; and
    the (N−1)th voltage state is a second highest state in the N voltage states.

11. The memory device of claim 8, wherein to determine that the step voltage increase condition is met, the peripheral circuit is further configured to:
    determine that a threshold voltage is outside a second voltage range.

12. The memory device of claim 11, wherein:
    the memory device includes the memory cells that are associated with N voltage states;
    the second voltage range corresponds to a Nth voltage state;
    wherein the Nth voltage state is a highest state in the N voltage states; and
    wherein the determining that the threshold voltage is outside the second voltage range is a first verification of the Nth voltage state.

13. The memory device of claim 8, wherein to determine that the step voltage increase condition is met, the peripheral circuit is further configured to:
    determine a number of programming operations performed on the memory cell; and
    determine that the number of programming operations exceeds a predetermined threshold.

* * * * *